(12) United States Patent
Patel et al.

(10) Patent No.: US 12,498,866 B2
(45) Date of Patent: Dec. 16, 2025

(54) COMPREHENSIVE LOAD BALANCING IN A HOST DEVICE THROUGH CONSISTENT PATH SELECTION FOR DATA COPY OFFLOAD

(71) Applicant: Dell Products L.P., Round Rock, TX (US)

(72) Inventors: Rimpesh Patel, Bangalore (IN); Amit Pundalik Anchi, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/353,493

(22) Filed: Jul. 17, 2023

(65) Prior Publication Data
US 2025/0028464 A1 Jan. 23, 2025

(51) Int. Cl.
*G06F 3/06* (2006.01)

(52) U.S. Cl.
CPC .......... *G06F 3/0635* (2013.01); *G06F 3/0604* (2013.01); *G06F 3/065* (2013.01); *G06F 3/067* (2013.01)

(58) Field of Classification Search
CPC .............................. G06F 3/0635; G06F 3/067
See application file for complete search history.

(56) References Cited

U.S. PATENT DOCUMENTS

| | | | |
|---|---|---|---|
| 6,567,397 B1 | 5/2003 | Campana, Jr. et al. | |
| 6,687,746 B1 | 2/2004 | Shuster et al. | |
| 6,697,875 B1 | 2/2004 | Wilson | |
| 7,275,103 B1 | 9/2007 | Thrasher et al. | |
| 7,454,437 B1 | 11/2008 | Lavallee et al. | |
| 7,617,292 B2 | 11/2009 | Moore et al. | |

(Continued)

FOREIGN PATENT DOCUMENTS

| | | |
|---|---|---|
| CN | 103677927 B | 2/2017 |
| EP | 1117028 A2 | 7/2001 |
| EP | 2667569 A1 | 11/2013 |

OTHER PUBLICATIONS

T10 Technical Committee, Extended Copy command, Apr. 2, 1999 [retrieved from internet Sep. 4, 2024][<URL:https://www.t10.org/ftp/t10/document.99/99-143r1.pdf>] (Year: 1999).*

(Continued)

*Primary Examiner* — Nicholas A. Paperno
(74) *Attorney, Agent, or Firm* — Ryan, Mason & Lewis, LLP

(57) ABSTRACT

An apparatus in one embodiment includes at least one processing device comprising a processor coupled to a memory. The at least one processing device is configured to maintain in a host device a data structure characterizing an ordered arrangement of available initiator-target pairs corresponding to respective paths between the host device and a storage system, to obtain a data copy offload command to offload a data copy operation from the host device to the storage system, to select a particular path for delivery of the data copy offload command from the host device to the storage system based at least in part on the ordered arrangement of available initiator-target pairs characterized by the data structure, and to send the data copy offload command from the host device to the storage system using the selected path.

18 Claims, 4 Drawing Sheets

(56) References Cited

U.S. PATENT DOCUMENTS

| | | |
|---|---|---|
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,534,738 B2 | 1/2020 | Ranjan et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 10,754,572 B2 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,838,648 B2 | 11/2020 | Sharma et al. |
| 10,880,217 B2 | 12/2020 | Mallick et al. |
| 10,884,935 B1 | 1/2021 | Doddaiah |
| 10,911,402 B2 | 2/2021 | Pusalkar et al. |
| 10,936,220 B2 | 3/2021 | Mallick et al. |
| 10,949,104 B2 | 3/2021 | Marappan et al. |
| 10,996,879 B2 | 5/2021 | Gokam |
| 11,016,699 B2 | 5/2021 | Anchi et al. |
| 11,016,783 B2 | 5/2021 | Rao et al. |
| 11,093,144 B1 | 8/2021 | Anchi et al. |
| 11,093,155 B2 | 8/2021 | Anchi et al. |
| 11,106,381 B2 | 8/2021 | Rao et al. |
| 11,126,363 B2 | 9/2021 | Tidke et al. |
| 11,157,203 B2 | 10/2021 | Gokam et al. |
| 11,366,590 B2 | 6/2022 | Mallick et al. |
| 11,366,771 B2 | 6/2022 | Smith et al. |
| 11,385,824 B2 | 7/2022 | Anchi et al. |
| 11,449,257 B2 | 9/2022 | Rao et al. |
| 11,449,440 B2 | 9/2022 | Anchi et al. |
| 11,620,240 B2 | 4/2023 | Anchi et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2004/0230704 A1* | 11/2004 | Balasubramanian ........ H04L 67/1097 709/253 |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0028163 A1 | 1/2008 | Woods et al. |
| 2008/0043973 A1 | 2/2008 | Lai et al. |
| 2008/0201458 A1 | 8/2008 | Salli |
| 2008/0301332 A1 | 12/2008 | Butler et al. |
| 2009/0259749 A1 | 10/2009 | Barrett et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0016981 A1* | 1/2012 | Clemm ........ H04L 43/08 709/224 |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0222705 A1 | 8/2015 | Stephens |
| 2015/0242134 A1 | 8/2015 | Takada et al. |
| 2015/0301970 A1 | 10/2015 | Armstead et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0334987 A1 | 10/2019 | Mallick et al. |
| 2020/0021653 A1 | 1/2020 | Rao et al. |
| 2020/0045109 A1 | 2/2020 | Hegde et al. |
| 2020/0067839 A1* | 2/2020 | Iny ........ H04L 47/31 |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348869 A1 | 11/2020 | Gokam |
| 2020/0349094 A1 | 11/2020 | Smith et al. |
| 2020/0363985 A1 | 11/2020 | Gokam et al. |
| 2020/0372401 A1 | 11/2020 | Mallick et al. |
| 2021/0019054 A1 | 1/2021 | Anchi et al. |
| 2021/0026551 A1 | 1/2021 | Tidke et al. |
| 2021/0026650 A1 | 1/2021 | Rao et al. |
| 2021/0109658 A1* | 4/2021 | Mallick ........ G06F 3/0611 |
| 2021/0157502 A1 | 5/2021 | Rao et al. |
| 2021/0157509 A1* | 5/2021 | Anchi ........ G06F 3/0635 |
| 2021/0181965 A1 | 6/2021 | Anchi et al. |
| 2021/0255784 A1 | 8/2021 | Anchi et al. |
| 2021/0263665 A1 | 8/2021 | Rao et al. |
| 2022/0129195 A1* | 4/2022 | Kanjirathinkal ........ G06F 3/067 |
| 2022/0171559 A1 | 6/2022 | Anchi et al. |
| 2022/0179804 A1 | 6/2022 | Anchi et al. |

OTHER PUBLICATIONS

International Search Report and Written Opinion of PCT/US2019/052549 dated Dec. 4, 2019, 13 pages.

International Search Report and Written Opinion of PCT/US2019/053204 dated Dec. 16, 2019, 40 pages.

International Search Report and Written Opinion of PCT/US2019/053473 dated Dec. 19, 2019, 16 pages.

International Search Report and Written Opinion of PCT/US2019/067144 dated May 4, 2020, 26 pages.

Kris Piepho, "Dell EMC SC Series Storage: Microsoft Multipath I/O," Dell EMC Best Practices, Jan. 2017, 57 pages.

NVM Express, "NVM Express, Revision 1.3," NVM Express, May 1, 2017, 282 pages.

Vmware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

(56) References Cited

OTHER PUBLICATIONS

Dell EMC, "Dell EMC SC Series Storage and Microsoft Multipath I/O," CML 1004, Jul. 2018, 36 pages.
Vmware, Inc. "VMware VMFS Volume Management," 2009, 8 pages.
Dell EMC, "Dell EMC Unity: Virtualization Integration," Technical White Paper, Oct. 2019, 39 pages.
Dell EMC, "Dell EMC PowerMax: iSCSI Implementation for Dell EMC Storage Arrays Running PowerMaxOS," Technical White Paper, Sep. 2019, 35 pages.
NVM Express, "Nvm Express Base Specification, Revision 2.0a," NVM Express, Jul. 23, 2021, 454 pages.
NVM Express, "NVM Express Base Specification, Revision 2.0b," NVM Express, Jan. 6, 2022, 455 pages.
Dell Technologies, "Dell EMC Metro Node 7.0.1," Product Guide, Jul. 2021, 33 pages.
Dell Technologies, "Asymmetric Logical Unit Access," https://infohub.delltechnologies.com/l/dell-powervault-me5-series-vmware-vsphere-best-practices/asymmetric-logical-unit-access, Accessed Jan. 10, 2023, 1 page.
Dell Technologies, "NVMe Common Storage Elements," https://infohub.delltechnologies.com/l/nvme-nvme-tcp-and-dell-smartfabric-storage-software-overview-ip-san-solution-primer-1/nvme-common-storage-elements, Accessed Jan. 10, 2023, 6 pages.

\* cited by examiner

COMPREHENSIVE LOAD BALANCING IN A HOST DEVICE THROUGH CONSISTENT PATH SELECTION FOR DATA COPY OFFLOAD

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and Non-Volatile Memory Express (NVMe) access protocols. Copying of data from one logical storage device to another can be problematic in certain situations. For example, if such data copying is done primarily by the host device, the copying consumes excessive resources of the host device, and as a result can adversely impact system performance. Moreover, offloading the data copying from the host device to the storage system can adversely impact load balancing implemented by the host device. A need therefore exists for improved techniques that can avoid these and other drawbacks of conventional approaches.

SUMMARY

Illustrative embodiments provide comprehensive load balancing in a host device through consistent path selection for data copy offload commands and their respective subsequent related commands.

Such embodiments advantageously avoid the need for the host device to consume its resources in performing a data copy operation, by facilitating the offload of the data copy operation to the storage system. This overcomes difficulties of conventional arrangements, including adverse load balancing impacts that might otherwise arise when using SCSI extended copy ("XCOPY") commands or other types of data copy offload commands that typically have one or more subsequent related commands. The subsequent related commands may comprise, for example, receive copy results commands used to obtain copy results of respective data copy offload commands.

In some embodiments, the term "comprehensive load balancing" illustratively refers to an example arrangement of the type disclosed herein in which a given data copy offload command and any follow-up commands related to the given data copy offload command, such as a corresponding receive copy results command, are automatically subject to consistent path selection, thereby significantly enhancing the load balancing process and providing improved overall system performance.

In one embodiment, an apparatus comprises at least one processing device that includes a processor and a memory coupled to the processor. The at least one processing device is illustratively configured to maintain in a host device a data structure characterizing an ordered arrangement of available initiator-target pairs corresponding to respective paths between the host device and a storage system, to obtain a data copy offload command to offload a data copy operation from the host device to the storage system, to select a particular path for delivery of the data copy offload command from the host device to the storage system based at least in part on the ordered arrangement of available initiator-target pairs characterized by the data structure, and to send the data copy offload command from the host device to the storage system using the selected path.

The at least one processing device illustratively comprises at least a portion of the host device, although numerous other arrangements of one or more processing devices, each comprising processor and memory components, are possible.

Additionally or alternatively, the at least one processing device in some embodiments further comprises at least one multi-path input-output (MPIO) driver configured to control delivery of IO operations from the host device to the storage system. The at least one MPIO driver is illustratively configured to maintain at least portions of the data structure and to select paths based at least in part on the ordered arrangement of available initiator-target pairs characterized by the data structure.

In some embodiments, maintaining the data structure characterizing the ordered arrangement of available initiator-target pairs corresponding to respective paths between the host device and the storage system illustratively comprises determining respective identifiers of the available initiator-target pairs, sorting the determined identifiers using one or more specified criteria, assigning numerical values in a numerical sequence to the sorted identifiers, and storing the assigned numerical values in association with the respective corresponding identifiers in the data structure.

Additionally or alternatively, selecting a particular path for delivery of the data copy offload command from the host device to the storage system based at least in part on the ordered arrangement of available initiator-target pairs characterized by the data structure illustratively comprises obtaining a unique identifier from the data copy offload command, performing a modulo arithmetic operation using the unique identifier, and selecting the particular path from the ordered arrangement based at least in part on a result of the modulo arithmetic operation.

In some embodiments, the data copy offload command comprises an extended copy command that includes a list identifier assigned in conjunction with generation of the data copy offload command.

Selecting a particular path for delivery of the data copy offload command from the host device to the storage system based at least in part on the ordered arrangement of available initiator-target pairs characterized by the data structure in such an embodiment illustratively comprises identifying the particular path from a particular initiator-target pair entry in the ordered arrangement having an assigned numerical value given by the list identifier modulo a total number of initiator-target pair entries in the ordered arrangement.

In some embodiments, the at least one processing device is further configured to automatically send each of one or more subsequent commands related to the data copy offload command using the same initiator-target pair used to send the data copy offload command, illustratively by selecting the particular path for delivery of each of the one or more subsequent commands related to the data copy offload command from the host device to the storage system based at least in part on the ordered arrangement of available initiator-target pairs characterized by the data structure.

In some embodiments, one or more subsequent commands related to the data copy offload command are automatically sent using the same initiator-target pair used to send the data copy offload command. This is illustratively achieved by performing consistent path selection based at least in part on the ordered arrangement of available initiator-target pairs, such that the same path used to send the data copy offload command will also be selected to send any such subsequent related commands.

For example, in some embodiments, each of the data copy offload command and the one or more subsequent commands related to the data copy offload command includes a same unique list identifier that when subject to a modulo arithmetic operation results in a same assigned numerical value identifying the particular path from a particular initiator-target pair entry in the ordered arrangement.

Illustrative embodiments disclosed herein advantageously allow comprehensive load balancing to be automatically and efficiently performed by the host device in the presence of data copy offload commands and their subsequent related commands.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
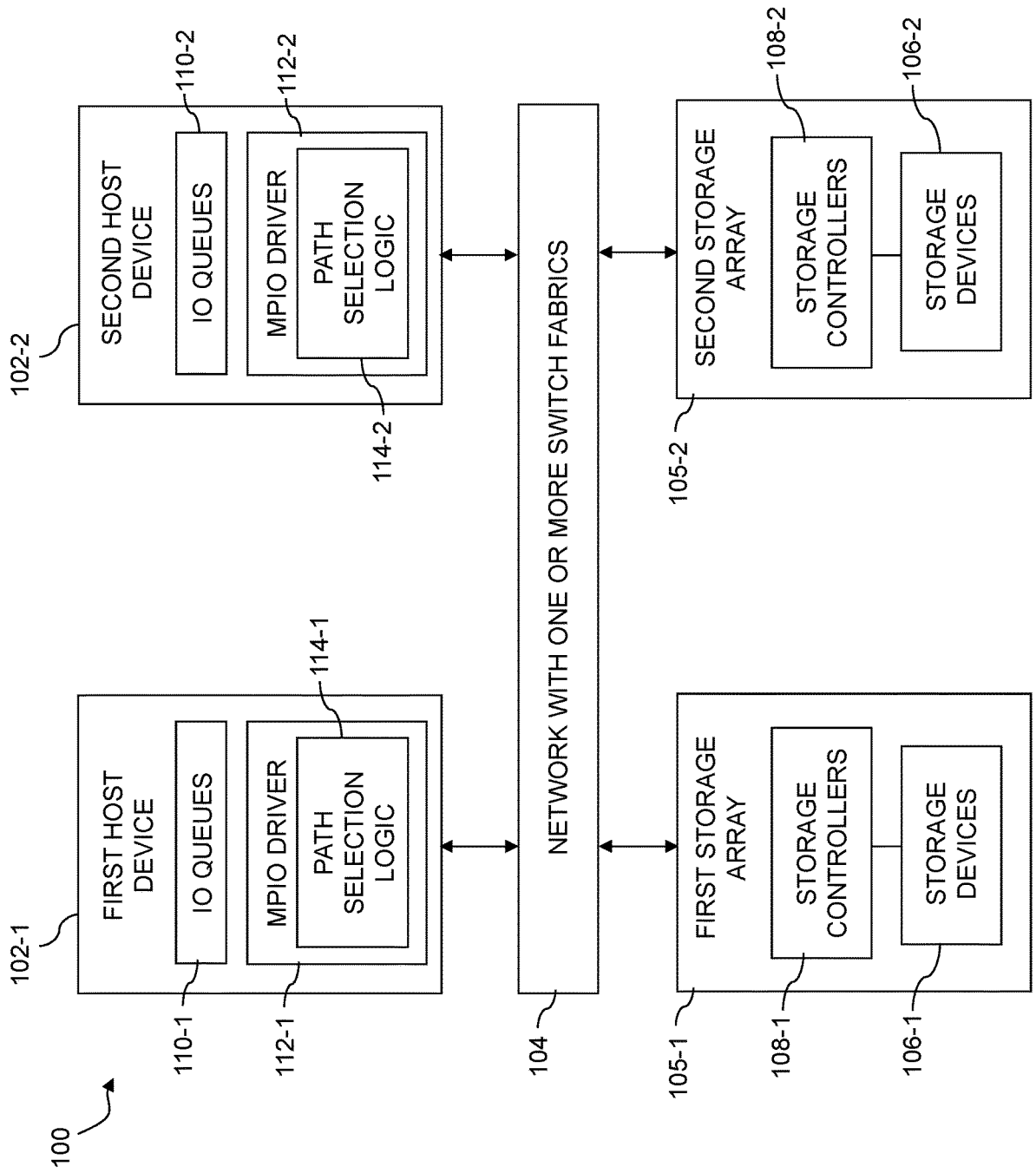
FIG. 1 is a block diagram of an information processing system configured with functionality for comprehensive load balancing of data copy offload commands in an illustrative embodiment.

FIG. 1 shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises one or more switch fabrics. The host devices 102 communicate over the network 104 via the one or more switch fabrics with at least first and second storage arrays 105-1 and 105-2, also collectively referred to herein as first and second storage arrays 105, or simply storage arrays 105. For example, in some embodiments the network 104 illustratively comprises at least one storage area network (SAN) and the one or more switch fabrics illustratively comprise respective distinct switch fabrics of a set of multiple switch fabrics interconnecting the host devices 102 with the storage arrays 105 over the one or more SANs. Each of the one or more switch fabrics in some embodiments is associated with a different SAN.

The system 100 may be configured such that the first host device 102-1 communicates with the first storage array 105-1 over a first switch fabric and communicates with the second storage array 105-2 over a second switch fabric. Similarly, the second host device 102-2 can communicate with the first storage array 105-1 over the first switch fabric and communicate with the second storage array 105-2 over the second switch fabric. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102 and two storage arrays 105 are shown in the figure, this is by way of illustrative example only, and other embodiments can include additional instances of such elements. It is also possible that alternative embodiments may include only a single host device and/or a single storage array.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The first and second storage arrays 105-1 and 105-2 comprise respective sets of storage devices 106-1 and 106-2, collectively referred to herein as storage devices 106, coupled to respective sets of storage controllers 108-1 and 108-2, collectively referred to herein as storage controllers 108. The storage controllers 108 may comprise, for example, storage processors, service processors, and/or other arrangements of processing circuitry configured to process IO operations received by the corresponding storage array. The term "storage controller" as used herein is therefore intended to be broadly construed, so as to encompass these and other arrangements, such as processing devices that are more particularly referred to herein as storage array processors. Each of the storage controllers 108 illustratively has one or more ports associated therewith for supporting communications between the storage arrays 105 and the host devices 102 over the network 104.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices. In some embodiments, at least one of the storage arrays 105 illustratively comprises one or more PowerMax™ or PowerStore™ storage arrays, commercially available from Dell Technologies.

As another example, one or both of the storage arrays 105 may comprise respective clustered storage systems, each including a plurality of storage nodes interconnected by one or more networks. An example of a clustered storage system of this type is a scale-out all-flash content addressable storage array distributed over multiple storage nodes.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 105 in some embodiments may be implemented as part of cloud infrastructure in the form of a cloud-based system.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 illustratively implement logical units (LUNs) configured to store objects for users associated with the host devices 102. These objects can comprise files, blocks or other types of objects.

The host devices 102 interact with the storage arrays 105 utilizing read and write commands as well as other types of commands that are transmitted over the network 104. The above-noted LUNs are examples of what are more generally referred to herein as logical storage volumes, or still more generally, logical storage devices.

The read and write commands in some embodiments more particularly comprise SCSI commands, although other types of commands may be used in other embodiments, including commands that are part of a standard command set, such as NVMe commands, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by one of the host devices 102 to one of the storage arrays 105 is considered an "outstanding" command until such time as its execution is completed in the viewpoint of the sending host device, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes.

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

As a more particular example, the host devices 102 in some embodiments illustratively comprise an ESXi environment or other type of host environment that supports non-disruptive movement of applications between ESXi servers or other types of servers, possibly using vMotion or other similar techniques to move VMs, in which those application execute, from one server to another server.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with the NVMe access protocol, as described in the NVMe Base Specification, Revision 2.0b, Jan. 6, 2022, which is incorporated by reference herein. Other storage access protocols of this type that may be utilized in illustrative embodiments disclosed herein include NVMe over Fabric, also referred to as NVMeoF, and NVMe over Transmission Control Protocol (TCP), also referred to as NVMe/TCP.

In some embodiments, the storage arrays 105 may be arranged in a configuration in which one of the storage arrays 105 is designated as a local storage array relative to at least one of the host devices 102, and the other one of the storage arrays 105 is designated as a remote storage array relative to at least one of the host devices 102. For example, the storage arrays may be arranged in a metro and/or stretched ("metro/stretched") configuration or other active-active configuration, or another type of configuration relative to one another that involves local-remote designations.

As a more particular illustration, the first and second storage arrays 105-1 and 105-2 in some embodiments may be arranged in an active-active configuration, although use of such a configuration is not required. In an example of an active-active configuration that may be used, data stored in one of the storage arrays 105 is replicated to the other one of the storage arrays 105 utilizing a replication process. Such data replication across the multiple storage arrays 105 can be used to facilitate failure recovery in the system 100. One of the storage arrays 105 may therefore operate as a production storage array relative to the other storage array which operates as a backup or recovery storage array. Examples of active-active configurations include "metro" or "stretched" high availability storage array configurations. The term "active-active configuration" as used herein is therefore intended to be broadly construed.

The first and second storage arrays 105-1 and 105-2 in some embodiments may be configured to participate in a replication process, such as a synchronous replication process. In accordance with one type of synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

This type of synchronous replication process is therefore configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for concurrent operation of such modes and separate operation of the individual modes. It is also possible in some embodiments that a given replication process implemented using storage arrays 105 may comprise only synchronous replication or only asynchronous replication, instead of multiple distinct replication modes.

A given logical storage device implemented on one or both of the storage arrays 105 in the system 100 illustratively comprises a set of one or more LUNs or other logical storage volumes of one or both of the storage arrays 105. Each such LUN or other logical storage volume is assumed to comprise at least a portion of a physical storage space of one or more of the storage devices 106 of the corresponding storage arrays 105.

The host devices 102 comprise respective sets of IO queues 110-1 and 110-2, and respective MPIO drivers 112-1 and 112-2. The MPIO drivers 112 collectively comprise a multi-path layer of the host devices 102. The multi-path layer provides functionality for comprehensive load balancing of data copy offload commands using respective instances of path selection logic 114-1 and 114-2 implemented within the MPIO drivers 112.

The MPIO drivers 112 may comprise, for example, otherwise conventional MPIO drivers, such as PowerPath® drivers from Dell Technologies, suitably modified in the manner disclosed herein to support at least portions of the disclosed functionality for comprehensive load balancing of data copy offload commands. Other types of MPIO drivers from other driver vendors may be suitably modified to incorporate functionality for comprehensive load balancing of data copy offload commands as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals. In illustrative embodiments herein, as described in more detail below, such path selection is advantageously performed in a manner that provides comprehensive load balancing in the presence of data copy offload commands and their respective subsequent related comments.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical storage device of one of the storage arrays 105. The corresponding logical storage device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing. MPIO driver 112-1 of host device 102-1 is configured to control delivery of IO operations from the host device 102-1 to the first and second storage arrays 105 over selected paths through the network 104.

The MPIO driver 112-1 is also illustratively configured to implement, utilizing its path selection logic 114-1 and associated data copy offload logic to be described in more detail below, at least portions of the disclosed functionality for comprehensive load balancing of data copy offload commands in the host device 102-1. Other host device components, such as, for example logic components implemented in one or more host device processors external to the MPIO driver 112-1, can additionally or alternatively implement aspects of such comprehensive load balancing functionality of the host device 102-1. The disclosed embodiments are therefore not limited to embodiments in which functionality for comprehensive load balancing of data copy offload commands and their respective subsequent related commands is controlled at least in part by an MPIO driver or multi-path layer.

Illustrative embodiments disclosed herein advantageously address and overcome problems that might otherwise arise when offloading data copying from a host device to a storage system. For example, conventional approaches can adversely impact load balancing implemented by the host device.

These and other embodiments disclosed herein facilitate the offload of data copying to the storage system through comprehensive load balancing of data copy offload commands and their respective subsequent related commands. This overcomes difficulties of conventional arrangements, including adverse load balancing impacts that might otherwise arise when using SCSI extended copy ("XCOPY") commands or other types of data copy offload commands that typically have one or more subsequent related commands. The subsequent related commands may comprise, for example, receive copy results commands used to obtain copy results of respective data copy offload commands.

In some embodiments, the term "comprehensive load balancing" illustratively refers to an arrangement of the type disclosed herein in which a given data copy offload command and any follow-up commands related to the given data copy offload command, such as a corresponding receive copy results command, are automatically subject to consistent path selection, thereby significantly enhancing the load balancing process and providing improved overall system performance.

In accordance with the functionality for comprehensive load balancing of data copy offload commands as disclosed herein, a given one of the host devices 102, illustratively the host device 102-1 at least in part via its multi-path layer comprising MPIO driver 112-1, is configured to maintain a data structure characterizing an ordered arrangement of available initiator-target pairs corresponding to respective paths between the host device 102-1 and at least one of the storage arrays 105, also referred to below as a "storage system."

The host device 102-1 is further configured to obtain a data copy offload command to offload a data copy operation from the host device to the storage system, to select a particular path for delivery of the data copy offload command from the host device to the storage system based at least in part on the ordered arrangement of available initiator-target pairs characterized by the data structure, and to send the data copy offload command from the host device to the storage system using the selected path.

The host device 102-1 is an example of what is more generally referred to herein as "at least one processing device" that includes a processor coupled to a memory. Other types and arrangements of one or more processing devices may be utilized in other embodiments to implement the disclosed functionality for comprehensive load balancing of data copy offload commands.

In some embodiments, such as those utilizing a SCSI access protocol, the data copy offload commands comprise respective XCOPY commands, although other types of data copy offload commands, possibly involving other storage access protocols such as NVMe, can be used. The term "data copy offload command" as used herein is therefore intended to be broadly construed. A subsequent related command, such as a receive copy results command associated with a given data copy offload command, is also itself considered a type of data copy offload command as that term is broadly used herein.

Data copy offload commands such as the above-noted SCSI XCOPY commands can be used in operations such as, for example, VM cloning, VM migration using vMotion, and/or VM creation from templates (e.g., bulk copying to create many similar VMs at one time), and in numerous other data copying contexts. An XCOPY command typically requests that a storage array or other storage system perform data copying and thereby relieves a host device from consuming critical resources, such as central processing unit (CPU) cycles, direct memory access (DMA) buffers and HBA queues, that would otherwise be consumed if the host device performed the data copying.

In some embodiments, maintaining the data structure characterizing the ordered arrangement of available initiator-target pairs corresponding to respective paths between the host device 102-1 and the storage system comprises determining respective identifiers of the available initiator-target pairs, sorting the determined identifiers using one or more specified criteria, assigning numerical values in a numerical sequence to the sorted identifiers, and storing the assigned numerical values in association with the respective corresponding identifiers in the data structure.

By way of example, sorting the determined identifiers using one or more specified criteria in some embodiments illustratively comprises alphanumerically sorting the determined identifiers to produce an alphanumerically-sorted listing of the determined identifiers. Other types of sorting resulting in other types of ordered listings of identifiers can additionally or alternatively be used in other embodiments.

In some embodiments, assigning numbers in the numerical sequence to the sorted identifiers illustratively comprises assigning numbers 0, 1, 2 . . . n–1 to respective ones of the sorted identifiers where n denotes a total number of the available initiator-target pairs. Other types of numbering can be used in other embodiments. Also, an "ordered arrangement" as that term is broadly used herein does not require use of assigned numbers, as other types of indicators could be used in place of or in addition to numbers. Nonetheless, the term "number" as used in this context is intended to be broadly construed so as to include numerical values in any of a wide variety of different formats.

Also, the term "data structure" as used herein is intended to be broadly construed so as to encompass, for example, one or more tables or other arrays of information elements. A given data structure can itself include a combination of multiple smaller data structures, and may be distributed across multiple memories or other storage devices and/or across multiple processing devices.

Furthermore, the term "available" in the context of available initiator-target pairs is similarly intended to be broadly construed, and should not be construed as being limited, for example, to currently available and/or immediately available initiator-target pairs, but can more generally include one or more initiator-target pairs that are expected to become available within a given timeframe for utilization thereof to send data copy offload commands and/or subsequent related commands to the storage system.

In some embodiments, selecting a particular path for delivery of the data copy offload command from the host device 102-1 to the storage system based at least in part on the ordered arrangement of available initiator-target pairs characterized by the data structure comprises obtaining a unique identifier from the data copy offload command, performing a modulo arithmetic operation using the unique identifier, and selecting the particular path from the ordered arrangement based at least in part on a result of the modulo arithmetic operation.

As indicated above, in some embodiments, the data copy offload command comprises an extended copy command. Such an extended copy command illustratively includes a list identifier assigned in conjunction with generation of the data copy offload command. In such an embodiment, selecting a particular path for delivery of the data copy offload command from the host device 102-1 to the storage system based at least in part on the ordered arrangement of available initiator-target pairs characterized by the data structure comprises identifying the particular path from a particular initiator-target pair entry in the ordered arrangement having an assigned numerical value given by the list identifier modulo a total number of initiator-target pair entries in the ordered arrangement.

In some embodiments, the extended copy command illustratively comprises copy-source and copy-destination descriptors identifying respective source and destination logical storage devices and one or more segment descriptors each identifying particular data to be copied from the source logical storage device to the destination logical storage device in accordance with the data copy offload command. Again, a wide variety of different types of data copy offload commands can be used in other embodiments.

The host device 102-1 in some embodiments is further configured at least in part via its MPIO driver 112-1 to automatically send each of one or more subsequent commands related to a given data copy offload command using the same initiator-target pair used to send that data copy offload command, by selecting the particular path for delivery of each of the one or more subsequent commands related to the data copy offload command from the host device 102-1 to the storage system based at least in part on the ordered arrangement of available initiator-target pairs characterized by the data structure.

In some embodiments, each of the data copy offload command and the one or more subsequent commands related to the data copy offload command illustratively includes a same unique list identifier that when subject to a modulo arithmetic operation results in a same assigned numerical value identifying the particular path from a particular initiator-target pair entry in the ordered arrangement.

The host device 102-1 in some embodiments is further configured at least in part via its MPIO driver 112-1 to determine a total number of in-flight data copy offload commands, and to control adjustment of the data structure characterizing the ordered arrangement of available initiator-target pairs based at least in part on the determined total number of in-flight data copy offload commands. For example, the MPIO driver 112-1 may wait until it has determined that the total number of in-flight data copy offload commands is zero before making any adjustment to the data structure. Such in-flight data copy offload commands illustratively includes any in-flight subsequent related commands.

As indicated above, illustrative embodiments provide functionality for comprehensive load balancing of data copy offload commands, such as SCSI XCOPY commands and other types of storage copy offload commands, illustratively at least in part in an MPIO driver of one or more host devices. It is to be appreciated that the disclosed functionality can be readily adapted for use in a wide variety of different host device and storage system configurations, including configurations involving single or multiple storage arrays or other types and arrangements of storage systems, including clustered storage systems and other distributed storage systems comprising interconnected storage nodes.

Additional illustrative embodiments will now be described with reference to an example algorithm implemented in one or more of the host devices 102.

In some embodiments, an XCOPY command or other extended copy command illustratively requires a host application to use a list identifier to uniquely identify the extended copy command to a copy manager of a storage system. This unique list identifier is also used by the host application to initiate follow-ups such as requesting status of a specific extended copy command (e.g., by using a receive copy results command). The host application typically must maintain the uniqueness of this list identifier for a given initiator-target pair, also referred below as an IT nexus, for concurrent extended copy commands, where an IT nexus denotes a particular initiator-target pair comprising, for example, a particular HBA as an initiator and a particular storage array port as a target.

In accordance with SCSI Primary Commands-3 (SPC-3), an XCOPY command construct illustratively indicates via a No Receive Copy Results (NRCR) bit zero that the copy manager shall hold data for subsequent retrieval by the host application using a receive copy results command with a receive data service action. The receive copy results command generally needs to be sent to the same IT nexus with a matching list identifier as the original XCOPY command.

A similar result can be achieved via a List ID Usage field, in accordance with an SPC-4 XCOPY command construct.

As one illustration, if the host application has sent an XCOPY command X1 with a list identifier value n1=10 and the host MPIO driver has selected IT nexus T1 to deliver the command to the storage system, then in order to make further follow-up for this XCOPY command, the host application must use the same list identifier value n1=10 in the SCSI receive copy results command and this command also has to be sent using the same IT nexus T1 that was used to send the XCOPY. This IT nexus "chaining" requirement for XCOPY and its subsequent follow-up SCSI commands such as receive copy results commands, can make it unduly difficult for the multi-pathing software comprising the MPIO driver to perform accurate and efficient load balancing of such commands, as it would generally have to remember which IT nexus was used to send each of the XCOPY commands, so that it can send respective receive copy results commands relating to those XCOPY commands to the same IT nexus.

Unfortunately, by making load balancing more difficult, this IT nexus chaining requirement can lead to less than optimal performance in the storage array or other storage system under conventional practice. For example, it can prevent comprehensive load balancing of XCOPY commands across all available IT nexus instances, leading to excessive traffic on particular storage array ports and associated non-optimal array performance.

As indicated previously, illustrative embodiments solve this significant problem of conventional practice by configuring an MPIO driver or other arrangement of host multi-pathing software to automatically and efficiently perform comprehensive load balancing of data copy offload commands including respective follow-up SCSI commands such as receive copy results commands. More particularly, a given MPIO driver of a host device in illustrative embodiments is configured to load balance XCOPY commands among available IT nexus instances, while also storing all required information to ensure that subsequent follow-up SCSI commands for a given XCOPY command are automatically sent to the same IT nexus over which that XCOPY command was sent, so as to ensure correctness.

In some embodiments, an algorithm implemented at least in part by at least one processing device comprising an MPIO driver of at least one host device includes the following steps, although it is to be appreciated that additional or alternative steps, possibly performed at least in part in a different or overlapping order, can be used in other embodiments:

1. The MPIO driver identifies the available IT nexus instances and illustratively maintains an internal data structure or other type of host device data structure which characterizes the available IT nexus instances. Each such IT nexus instance, as indicated above, generally corresponds to a different initiator-target pair, and is assumed to have an associated identifier, such as an alphanumeric identifier.

2. The MPIO driver alphanumerically sorts the IT nexus instances by their respective identifiers and numbers the ordered IT nexus instances using a zero base numerical ordering of $0, 1, 2, \ldots n-1$, where n denotes the total number of available IT nexus instances. The data structure stores the available IT nexus instances ordered by numbers 0 through $n-1$. An example of such a data structure will be described in conjunction with FIG. 4 below. Other numbering arrangements can be used in other embodiments.

3. On receiving a given XCOPY command, illustratively an XCOPY command X1, the MPIO driver parses the XCOPY command construct, and determines the list identifier, illustratively a list identifier L1 uniquely assigned by the application that generated the XCOPY command X1.

4. The MPIO driver hashes this unique list identifier L1 using modulo n ("mod n") arithmetic, where, as noted above, n denotes the total number of available IT nexus instances, resulting in a value m1: $L1 \bmod n = m1, 0 \le m1 < n$. Other types of hashing arrangements and associated arithmetic operations can be used in other embodiments.

5. The MPIO driver illustratively implements a load balancing mechanism via its path selection logic, which is configured to dispatch the XCOPY command X1 having list identifier L1 to IT nexus m1.

6. If the application wants to send a subsequent follow-up for X1 with L1, it illustratively generates a follow-up SCSI command such as a receive copy results command, denoted as command R1, also with list identifier L1. This is an example of what is more generally referred to herein as a "subsequent related command."

7. The MPIO driver load balancing mechanism dispatches this R1 command with list identifier L1 using same hash/mod function ($L1 \bmod n = m1$), thereby automatically resulting in selection of the same IT nexus m1 that was used to send the original X1 command and maintaining the desired IT nexus correctness. This is advantageously achieved in a particularly efficient manner, without the MPIO driver having to store information indicating for each XCOPY command which XCOPY commands were sent over which IT nexus instances.

It should be noted that the sorting operation in the algorithm above can be repeated periodically or under other conditions, for example, after addition or removal of IT nexus instances for one or more LUNs or other logical storage volumes.

In some embodiments, the MPIO driver is configured to periodically check, for example, every t=3 minutes or so, if the number of concurrent ("in-flight") XCOPY commands is zero, at which point it can modify its internal data structure of IT nexus information and repeat the alphanumerical sorting without adversely impacting the load balancing functionality for in-flight XCOPY commands.

Again, the particular algorithm steps described above can be varied in other embodiments. For example, steps described as being performed serially can instead be performed at least in part in parallel with one another. Also, additional or alternative steps can be used to provide comprehensive load balancing in other embodiments.

At least portions of the functionality for comprehensive load balancing of data copy offload commands in illustrative embodiments is implemented within or otherwise utilizing the MPIO driver 112-1. For example, the MPIO driver 112-1 in some embodiments is configured to perform at least portions of the above-described example algorithm.

Although MPIO driver 112-1 is utilized to perform certain aspects of the functionality for comprehensive load balancing of data copy offload commands in some embodiments, this is by way of illustrative example only, and other embodiments need not utilize MPIO drivers in implementing such functionality. For example, Linux native multipathing arrangements utilizing device mappers, or other types and arrangements of host device components, can be configured to implement aspects of the functionality for comprehensive load balancing of data copy offload commands in other embodiments.

In addition, although the above-described functionality for comprehensive load balancing of data copy offload commands is primarily described above in the context of host device 102-1 and its MPIO driver 112-1, it is assumed that similar functionality for comprehensive load balancing of data copy offload commands is implemented by host device 102-2 and its MPIO driver 112-2.

As indicated above, the above-described functionality for comprehensive load balancing of data copy offload commands is illustratively carried out at least in part utilizing the MPIO driver 112-1 and its path selection logic 114-1. For example, in some embodiments, the functionality for comprehensive load balancing of data copy offload commands can be implemented substantially entirely under the control of the MPIO driver 112-1, and in such embodiments the path selection logic 114-1 is illustratively configured to control performance of one or more steps of the example algorithm above and/or the example process to be described below in conjunction with FIG. 2, possibly with the use of associated data copy offload logic. Additional or alternative host device components, such as additional or alternative logic components implemented in the host device, can be used to control performance of the FIG. 2 process or other algorithms in illustrative embodiments.

It is assumed that the other MPIO driver 112-2 is configured in a manner similar to that described above and elsewhere herein for the first MPIO driver 112-1. The MPIO driver 112-2 is therefore similarly configured to select IO operations from its corresponding one of the sets of IO queues 110 for delivery to the storage arrays 105 over the network 104 and to perform at least portions of the disclosed functionality for comprehensive load balancing of data copy offload commands.

Accordingly, aspects of functionality for comprehensive load balancing of data copy offload commands described above in the context of the first MPIO driver 112-1 and the first host device 102-1 are assumed to be similarly performed by the other MPIO driver 112-2 and the other host device 102-2.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, additional or alternative logic instances or other components implemented in the host devices 102 and the storage arrays 105 can be used to perform at least portions of the functionality for comprehensive load balancing of data copy offload commands.

The operation of the information processing system 100 will now be described in further detail with reference to the flow diagram of the illustrative embodiment of FIG. 2. The process as shown includes steps 200 through 206, and is suitable for use in the system 100 but is more generally applicable to other types of systems comprising at least one storage system and at least one host device that communicates with the storage system over a network. The host device illustratively comprises a given one of the first and second host devices 102-1 and 102-2, and the storage system illustratively comprises at least one of the first and second storage arrays 105. The storage devices of each such storage array are assumed to include logical storage devices such as LUNs or other logical storage volumes.

Figure 2:
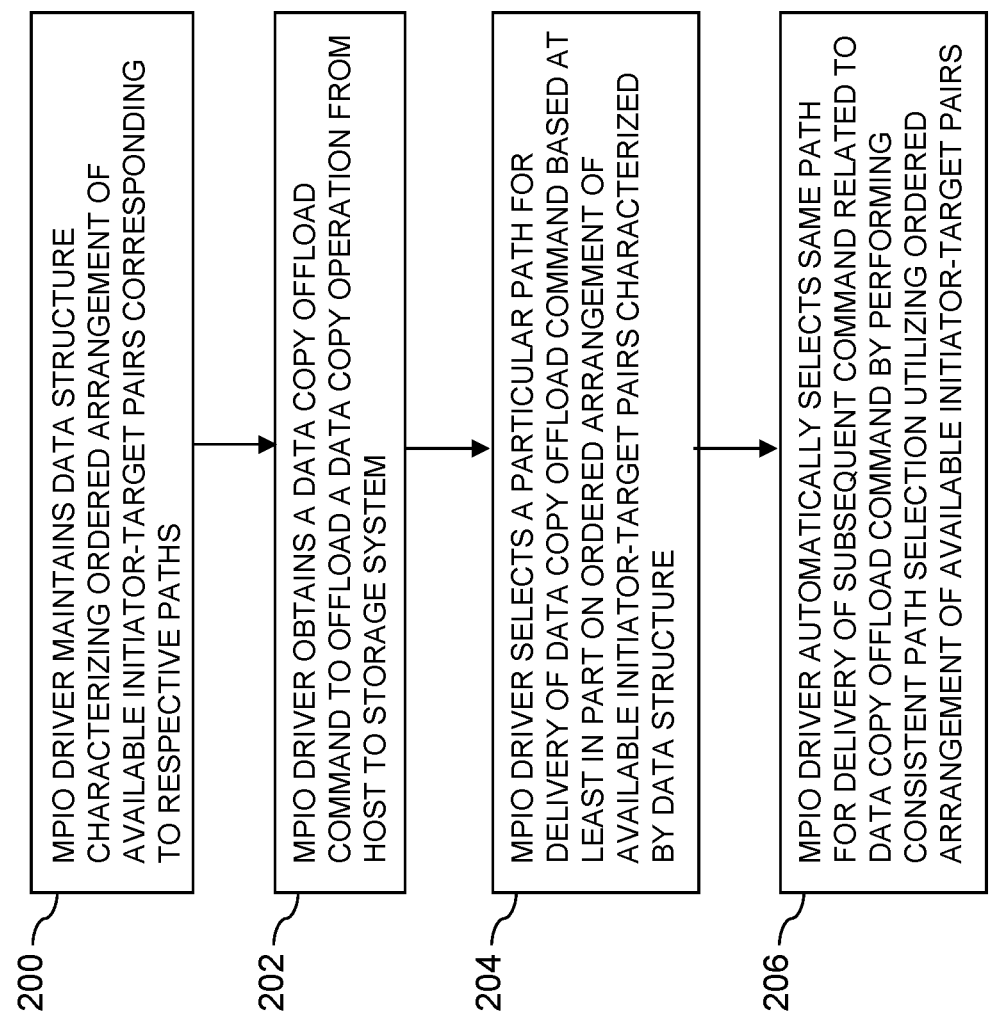
FIG. 2 is a flow diagram illustrating an example process for comprehensive load balancing of data copy offload commands in an illustrative embodiment.

The steps of the FIG. 2 process are illustratively performed at least in part by or under the control of an MPIO layer comprising one or more MPIO drivers of respective host devices, such as the MPIO drivers 112-1 and 112-2 of the first and second host devices 102-1 and 102-2 of system 100, although other arrangements of system components can control or perform at least portions of one or more of the steps in other embodiments. At least portions of the functionality of the FIG. 2 process may be performed at least in part in conjunction with a load balancing algorithm or other type of path selection algorithm executed by instances of path selection logic 114 of one or more MPIO drivers 112. A given host device is referred to as simply a "host" in some description herein.

In step 200, an MPIO driver of a host device maintains a data structure characterizing an ordered arrangement of available initiator-target pairs corresponding to respective paths between the host device and a storage system. As mentioned previously, such initiator-target pairs are referred to in some embodiments as respective IT nexus instances.

In step 202, the MPIO driver obtains a data copy offload command to offload a data copy operation from the host device to the storage system. For example, the MPIO driver can retrieve the data copy offload command from one of the IO queues 110 or otherwise obtain the data copy offload command from an application that generates the command. The term "obtains" as used in this context is intended to be broadly construed, so as to encompass, for example, retrieving the command from an IO queue, receiving the command from another host device component, or generating the command.

In step 204, the MPIO driver via its path selection logic selects a particular path for delivery of the data copy offload command from the host device to the storage system, illustratively based at least in part on the ordered arrangement of available initiator-target pairs characterized by the data structure.

In step 206, the MPIO driver automatically selects the same path for delivery of a subsequent command related to the data copy offload command. This is illustratively achieved by performing consistent path selection utilizing the ordered arrangement of available initiator-target pairs in the manner described elsewhere herein.

The steps of the FIG. 2 process are shown in sequential order for clarity and simplicity of illustration only, and certain steps can at least partially overlap with other steps. Also, different ones of the steps can be performed at least in part by different host device components, such as additional or alternative components of the host device. Such components are illustratively part of an MPIO layer comprising one or more MPIO drivers, but in other embodiments can be implemented elsewhere in the host device.

As indicated above, different instances of the FIG. 2 process can execute at least in part in parallel with one another for different path selection processes involving different data copy offload commands and their respective subsequent related commands. Also, multiple additional instances of the FIG. 2 process can be performed in respective ones of one or more additional host devices that share the storage system.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for comprehensive load balancing of data copy offload commands. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different path selection arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
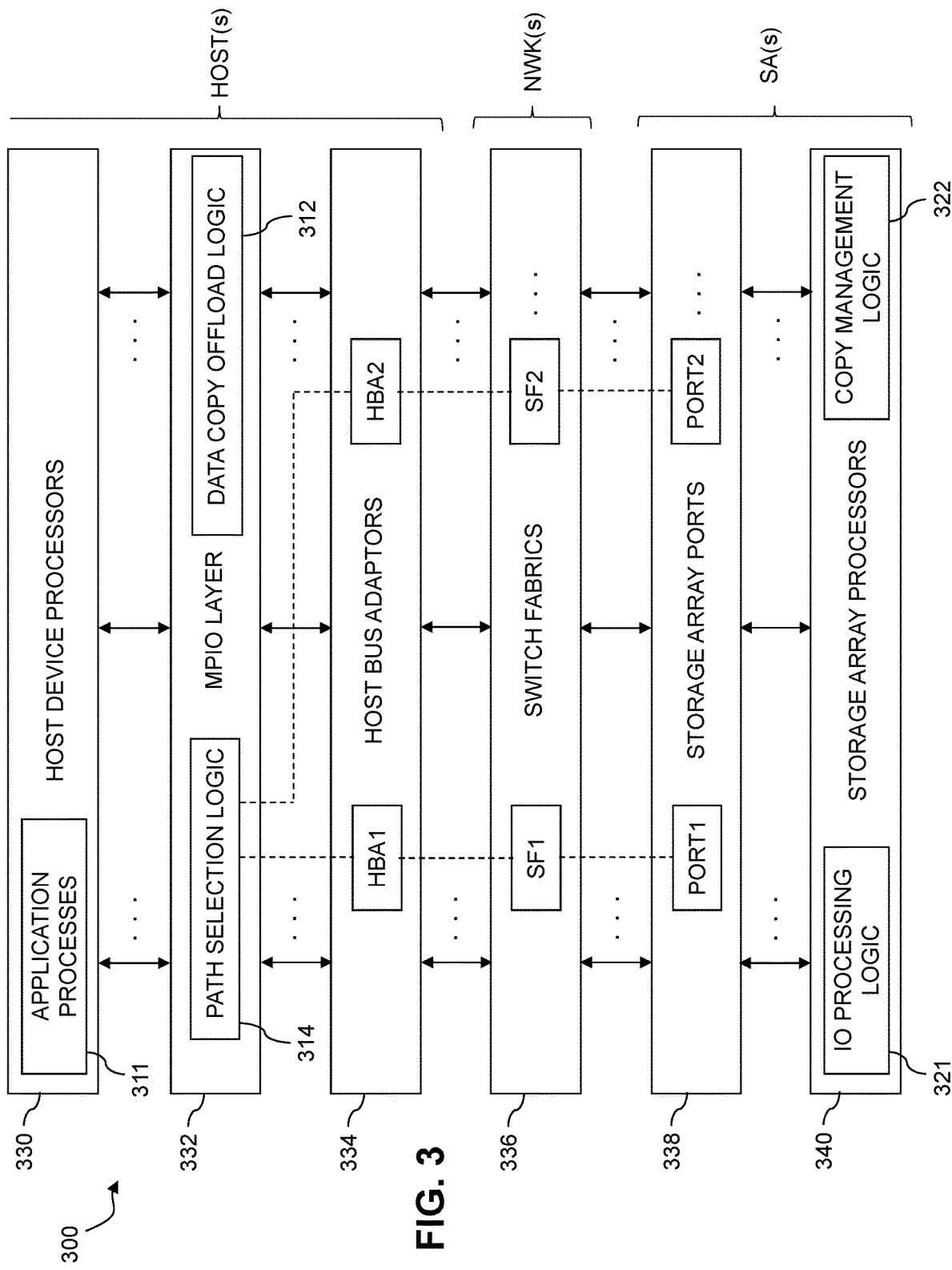
FIG. 3 is a block diagram showing multiple layers of a layered system architecture that includes functionality for comprehensive load balancing of data copy offload commands in an illustrative embodiment.

Referring now to FIG. 3, another illustrative embodiment is shown. In this embodiment, an information processing system 300 comprises host-side components that include data copy offload logic 312 and path selection logic 314, and storage-side components that include IO processing logic 321 and copy management logic 322. Additional or alternative host-side and storage-side components can be used in other embodiments. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. As illustrated in the figure, the host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements functionality for comprehensive load balancing through consistent path selection for data copy offload commands and their respective subsequent related commands, such as receive copy results commands. Such commands, as well as other types of IO operations, are illustratively generated by one or more application processes 311 running in one or more host device processors of the host device processor layer 330. The functionality for comprehensive load balancing of data copy offload commands in this embodiment is assumed to be controlled at least in part by the data copy offload logic 312 and the path selection logic 314, in cooperation with the copy management logic 322, although other arrangements are possible.

The comprehensive load balancing functionality is assumed to include maintenance of at least one data structure characterizing an ordered arrangement of available initiator-target pairs, with the initiator-target pairs corresponding to respective paths between one or more host devices and one or more storage arrays, as described in more detail elsewhere herein. The data copy offload logic 312 and path selection logic 314 can each include multiple distinct respective data copy offload logic instances and path selection logic instances for respective ones of a plurality of host devices of the system 300. Also, although data copy offload logic 312 is illustratively shown as being implemented in the MPIO layer 332, it can instead be implemented at least part elsewhere within the one or more host devices, such as in one or more host device processors of the host device processor layer 330.

The IO processing logic 321 implemented in the storage array processor layer 340 performs various types of processing for servicing of read requests, write requests and other types of IO operations received from one or more host devices of the system 300. The copy management logic 322 illustratively comprises one or more copy managers in each of one or more storage arrays. Such copy managers carry out the process of copying data in accordance with received data copy offload commands. In some embodiments, there may be separate instances of the IO processing logic 321 and the copy management logic 322 for each of a plurality of storage arrays of the system 300.

The host-side components including data copy offload logic 312 and path selection logic 314 and operate in conjunction with the storage-side components including IO processing logic 321 and copy management logic 322 to implement at least portions of the functionality for comprehensive load balancing of data copy offload commands and subsequent related commands as disclosed herein.

For example, one or more MPIO drivers of the MPIO layer 332 each illustratively maintain a data structure characterizing an ordered arrangement of available initiator-target pairs corresponding to respective paths between one or more host devices and one or more storage arrays, obtain a data copy offload command to offload a data copy operation from a host device to a storage array, select a particular path for delivery of the data copy offload command from the host device to the storage array based at least in part on the ordered arrangement of available initiator-target pairs characterized by the data structure, and send the data copy offload command from the host device to the storage array using the selected path. This functionality is illustratively implemented within a given MPIO driver utilizing its corresponding instances of data copy offload logic 312 and path selection logic 314. Such functionality in other embodiments can be performed at least in part outside of the one or more MPIO drivers, utilizing additional or alternative host device components.

The MPIO layer 332 is an example of what is also referred to herein as a multi-path layer, and comprises one or more MPIO drivers implemented in respective host devices. Each such MPIO driver illustratively comprises an instance of data copy offload logic 312 configured to maintain a data structure characterizing an ordered arrangement of available initiator-target pairs and an instance of path selection logic 314 configured to perform path selection for delivery of IO operations to the storage arrays of system 300, as previously described. As indicated above, the path selection logic 314 in some embodiments operates in conjunction with the data copy offload logic 312, the IO processing logic 321 and the copy management logic 322 in implementing at least portions of the functionality for comprehensive load balancing of data copy offload commands as disclosed herein. Additional or alternative layers and logic circuitry arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of multiple paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

In this illustrative embodiment, the host devices and storage arrays of system 300, through their respective instances of components 312, 321 and 322, provide functionality for comprehensive load balancing of data copy offload commands as disclosed herein, illustratively with involvement of other host device or system components, such as the path selection logic 314 of MPIO layer 332.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Figure 4:
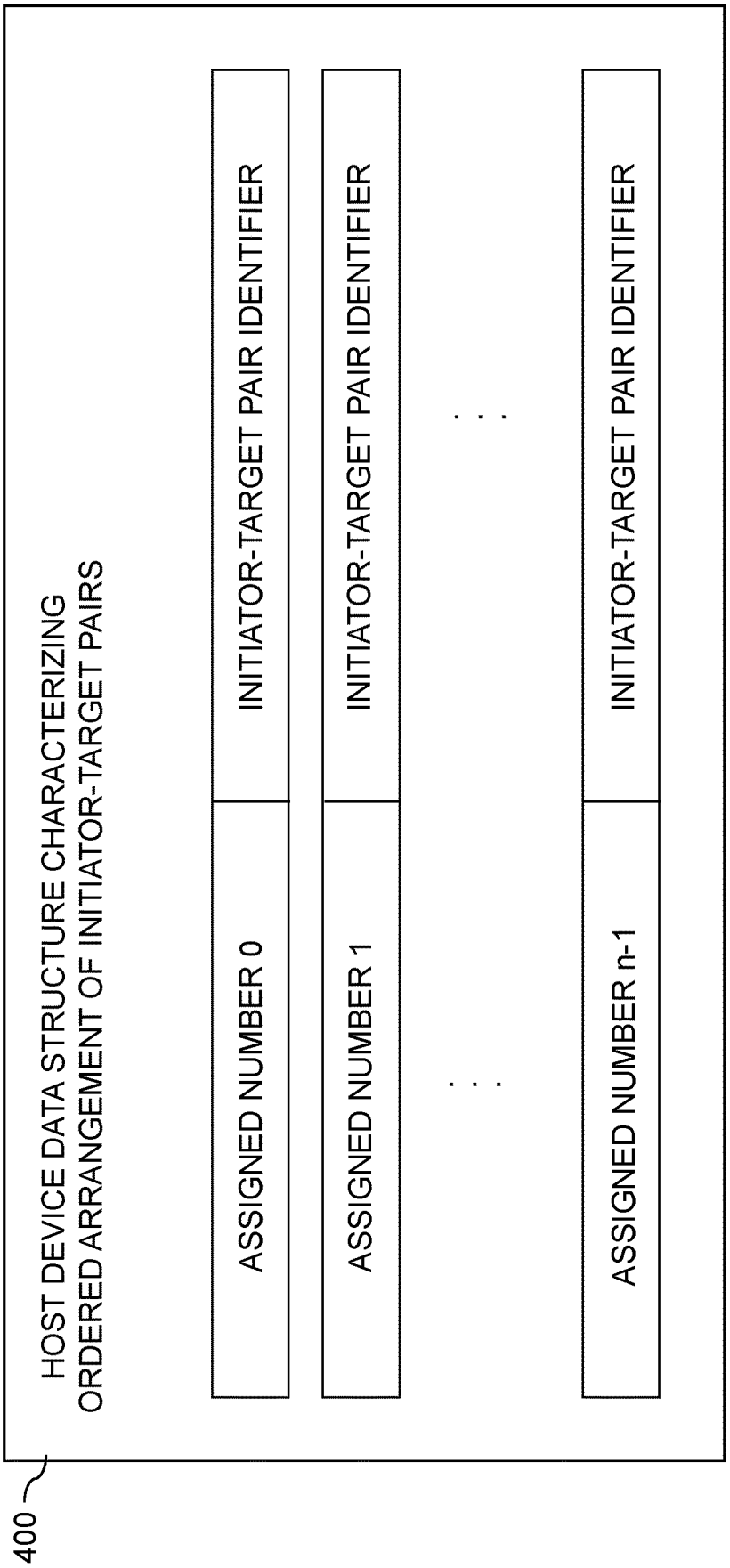
FIG. 4 shows an example of a host device data structure characterizing an ordered arrangement of initiator-target pairs in an illustrative embodiment.

Referring now to FIG. 4, an example of a host device data structure 400 characterizing an ordered arrangement of initiator-target pairs is shown. In the data structure 400, a plurality of available initiator-target pairs, illustratively n such pairs, are alphanumerically sorted by their respective identifiers. Other types of sorting can be used in other embodiments. The initiator-target pair identifiers are assumed to be ordered in an alphanumerically-sorted listing in the column at the right side of the figure. In conjunction with the sorting of the initiator-target pair identifiers, numbers in a numerical sequence are assigned to the sorted identifiers, as shown in the column at the left side of the figure. Such assignment illustratively occurs after the sorting, but can be done in other ways. In this embodiment, numbers 0, 1, 2 . . . n−1 are assigned to respective ones of the sorted identifiers where, as indicated previously, n denotes a total number of the available initiator-target pairs.

The maintenance of the data structure 400, including the above-described sorting and assigning operations, is illustratively performed at least in part by or otherwise under the control of data copy offload logic of one or more host devices, such as data copy offload logic 312 implemented in an MPIO driver of a given host device.

The particular illustrative ordered arrangement and associated data structure 400 shown in FIG. 4 is only an example, and numerous other ordered arrangements of available initiator-target pairs and associated data structures can be maintained by a host device in other embodiments. Terms such as "ordered arrangement" and "data structure" as used herein are intended to be broadly construed.

As described previously, the MPIO driver of the host device utilizes an ordered arrangement such as that implemented in data structure 400 of FIG. 4 in performing path selection for data copy offload commands and their respective subsequent related commands, so as to provide comprehensive load balancing in the presence of such commands. For example, the MPIO driver can extract a list identifier or other unique identifier from a given data copy offload command, and perform a modulo n arithmetic operation on that unique identifier to obtain a numerical value, illustratively corresponding to a particular one of the assigned numbers 0 to n−1, which uniquely corresponds to an identifier of a particular initiator-target pair. Such identifier extraction and modulo arithmetic functions are illustratively performed at least in part by data copy offload logic of the MPIO driver. The resulting initiator-target pair is then selected by the path selection logic of the MPIO driver for use in transmitting the given data copy offload command to the storage array.

Any subsequent related command, such as a receive copy results command, will include the same list identifier or other unique identifier as its associated data copy offload command, and when extracted from the subsequent related command and subjected to the same modulo arithmetic operation, will yield the same numerical value that resulted from similar processing of the data copy offload command.

Accordingly, the same resulting initiator-target pair is automatically selected by the path selection logic of the MPIO driver for use in transmitting the subsequent related command to the storage array. This ensures consistent path selection and facilitates comprehensive load balancing of data copy offload commands and their subsequent related commands, without requiring the MPIO driver to store, for each data copy offload command, the particular initiator-target pair that was used to transmit that command.

The above-described processes, algorithms and other features and functionality disclosed herein are presented by way of illustrative example only, and other embodiments can utilize additional or alternative arrangements.

Also, as mentioned previously, different instances of the above-described processes, algorithms and other techniques for comprehensive load balancing can be performed by different MPIO drivers in different host devices, or using other types of host drivers, such as, for example, iSCSI drivers.

Numerous alternative arrangements of these or other features can be used in implementing comprehensive load balancing in other illustrative embodiments.

It is apparent from the foregoing that the illustrative embodiments disclosed herein can provide a number of significant advantages relative to conventional arrangements.

For example, some embodiments configure host devices to include functionality for comprehensive load balancing of data copy offload commands of respective storage arrays or other storage systems.

Illustrative embodiments advantageously avoid the need for a host device to consume its resources in performing a data copy operation, by facilitating the offload of the data copy operation to the storage system.

Such embodiments overcome difficulties of conventional arrangements, including adverse load balancing impacts that might otherwise arise when using SCSI XCOPY commands or other types of data copy offload commands that typically have one or more subsequent related commands, such as receive copy results commands used to obtain copy results of respective data copy offload commands.

Some embodiments are advantageously configured to automatically ensure that a given data copy offload command and any follow-up commands related to the given data copy offload command, such as a corresponding receive copy results command, are automatically subject to consistent path selection, thereby significantly enhancing the load balancing process and providing improved overall system performance.

The disclosed functionality can be implemented using a wide variety of different host devices and storage systems.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as an Amazon Web Services (AWS) system, a Google Cloud Platform (GCP) system and a Microsoft Azure system. Virtual machines provided in such cloud-based systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a central processing unit (CPU), a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, data copy offload logic, IO processing logic, copy management logic and additional or alternative components. Also, the particular configurations of system and device elements and associated processing operations illustratively shown in the drawings can be varied in other embodiments. For example, a wide variety of different host device and storage system configurations, and associated comprehensive load balancing techniques, can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   at least one processing device comprising a processor coupled to a memory;
   said at least one processing device being configured:
   to maintain, by a multi-path input-output driver in a host device, a data structure characterizing an ordered arrangement of available initiator-target pairs corresponding to respective paths between the host device and a storage system, the data structure comprising a plurality of entries for respective ones of the initiator-target pairs, a given one of the entries of the data structure for a corresponding one of the initiator-target pairs comprising a first field that includes an identifier of that initiator-target pair in a first ordered sequence of initiator-target pair identifiers and a second field that includes a particular one in a second ordered sequence of a plurality of numbers assigned by the host device to respective ones of the initiator-target pairs, the assigned numbers being different than and separate from the corresponding initiator-target pair identifiers, the second ordered sequence comprising an integer sequence in which each integer in the integer sequence is different than every other integer in the integer sequence and in which a total number of integers in the integer sequence is equal to a total number of the initiator-target pairs, the initiator-target pair identifiers and the assigned numbers of the respective first and second fields of the plurality of entries being ordered within the data structure in accordance with the respective first and second ordered sequences;
   to obtain, in the multi-path input-output driver, a data copy offload command to offload a data copy operation from the host device to the storage system;
   to select, in the multi-path input-output driver, a particular path for delivery of the data copy offload command from the host device to the storage system based at least in part on the ordered arrangement of available initiator-target pairs characterized by the data structure, the particular path being selected as a function of (i) one or more of the assigned numbers in respective corresponding instances of the second field of the data structure and (ii) a list identifier of the data copy offload command, the list identifier being assigned to the data copy offload command in conjunction with generation of the data copy offload command, wherein the function is configured to uniquely map each of the list identifier of the data copy offload command and an additional list identifier of an additional command related to the data copy offload command to the particular path via a same particular one of the one or more of the assigned numbers in the respective corresponding instances of the second field of the data structure;
   to send, by the multi-path input-output driver, the data copy offload command from the host device to the storage system using the selected path, without storing an indication of the selected path used to send the data copy offload command;
   to detect, in the multi-path input-output driver, a condition under which (i) at least one initiator-target pair has been added to or removed from the available initiator-target pairs and (ii) a number of in-flight data copy offload commands is zero; and
   responsive to the detected condition, to modify the data structure to update the first and second ordered sequences.

2. The apparatus of claim 1 wherein said at least one processing device comprises at least a portion of the host device.

3. The apparatus of claim 1 wherein maintaining the data structure characterizing the ordered arrangement of available initiator-target pairs corresponding to respective paths between the host device and the storage system comprises:
   determining respective identifiers of the available initiator-target pairs;
   sorting the determined identifiers using one or more specified criteria;

assigning numerical values in a numerical sequence to the sorted identifiers; and storing the assigned numerical values in association with the respective corresponding identifiers in the data structure.

4. The apparatus of claim 3 wherein sorting the determined identifiers using one or more specified criteria comprises alphanumerically sorting the determined identifiers to produce an alphanumerically-sorted listing of the determined identifiers.

5. The apparatus of claim 3 wherein assigning numerical values in the numerical sequence to the sorted identifiers comprises assigning numbers 0, 1, 2, ... n−1 to respective ones of the sorted identifiers where n denotes a total number of the available initiator-target pairs.

6. The apparatus of claim 1 wherein selecting a particular path for delivery of the data copy offload command from the host device to the storage system based at least in part on the ordered arrangement of available initiator-target pairs characterized by the data structure comprises:

obtaining a unique identifier from the data copy offload command;

performing a modulo arithmetic operation using the unique identifier; and selecting the particular path from the ordered arrangement based at least in part on a result of the modulo arithmetic operation.

7. The apparatus of claim 1 wherein the data copy offload command comprises an extended copy command that includes the list identifier assigned in conjunction with generation of the data copy offload command.

8. The apparatus of claim 7 wherein selecting a particular path for delivery of the data copy offload command from the host device to the storage system based at least in part on the ordered arrangement of available initiator-target pairs characterized by the data structure comprises identifying the particular path from a particular initiator-target pair entry in the ordered arrangement having an assigned numerical value given by the list identifier modulo a total number of initiator-target pair entries in the ordered arrangement.

9. The apparatus of claim 7 wherein the extended copy command comprises copy-source and copy-destination descriptors identifying respective source and destination logical storage devices and one or more segment descriptors each identifying particular data to be copied from the source logical storage device to the destination logical storage device in accordance with the data copy offload command.

10. The apparatus of claim 1 wherein the at least one processing device is further configured to automatically send each of one or more subsequent commands related to the data copy offload command using the same initiator-target pair used to send the data copy offload command, by selecting the particular path for delivery of each of the one or more subsequent commands related to the data copy offload command from the host device to the storage system based at least in part on the ordered arrangement of available initiator-target pairs characterized by the data structure.

11. The apparatus of claim 10 wherein a given one of the one or more subsequent commands related to the data copy offload command comprises a receive copy results command.

12. The apparatus of claim 10 wherein each of the data copy offload command and the one or more subsequent commands related to the data copy offload command includes a same unique list identifier that when subject to a modulo arithmetic operation results in a same assigned numerical value identifying the particular path from a particular initiator-target pair entry in the ordered arrangement.

13. A computer program product comprising a non-transitory processor-readable storage medium having stored therein program code of one or more software programs, wherein the program code, when executed by at least one processing device comprising a processor coupled to a memory, causes said at least one processing device:

to maintain, by a multi-path input-output driver in a host device, a data structure characterizing an ordered arrangement of available initiator-target pairs corresponding to respective paths between the host device and a storage system, the data structure comprising a plurality of entries for respective ones of the initiator-target pairs, a given one of the entries of the data structure for a corresponding one of the initiator-target pairs comprising a first field that includes an identifier of that initiator-target pair in a first ordered sequence of initiator-target pair identifiers and a second field that includes a particular one in a second ordered sequence of a plurality of numbers assigned by the host device to respective ones of the initiator-target pairs, the assigned numbers being different than and separate from the corresponding initiator-target pair identifiers, the second ordered sequence comprising an integer sequence in which each integer in the integer sequence is different than every other integer in the integer sequence and in which a total number of integers in the integer sequence is equal to a total number of the initiator-target pairs, the initiator-target pair identifiers and the assigned numbers of the respective first and second fields of the plurality of entries being ordered within the data structure in accordance with the respective first and second ordered sequences;

to obtain, in the multi-path input-output driver, a data copy offload command to offload a data copy operation from the host device to the storage system;

to select, in the multi-path input-output driver, a particular path for delivery of the data copy offload command from the host device to the storage system based at least in part on the ordered arrangement of available initiator-target pairs characterized by the data structure, the particular path being selected as a function of (i) one or more of the assigned numbers in respective corresponding instances of the second field of the data structure and (ii) a list identifier of the data copy offload command, the list identifier being assigned to the data copy offload command in conjunction with generation of the data copy offload command, wherein the function is configured to uniquely map each of the list identifier of the data copy offload command and an additional list identifier of an additional command related to the data copy offload command to the particular path via a same particular one of the one or more of the assigned numbers in the respective corresponding instances of the second field of the data structure;

to send, by the multi-path input-output driver, the data copy offload command from the host device to the storage system using the selected path, without storing an indication of the selected path used to send the data copy offload command;

to detect, in the multi-path input-output driver, a condition under which (i) at least one initiator-target pair has been added to or removed from the available initiator-target pairs and (ii) a number of in-flight data copy offload commands is zero; and responsive to the detected condition, to modify the data structure to update the first and second ordered sequences.

14. The computer program product of claim 13 wherein maintaining the data structure characterizing the ordered arrangement of available initiator-target pairs corresponding to respective paths between the host device and the storage system comprises:
   determining respective identifiers of the available initiator-target pairs;
   sorting the determined identifiers using one or more specified criteria;
   assigning numerical values in a numerical sequence to the sorted identifiers; and
   storing the assigned numerical values in association with the respective corresponding identifiers in the data structure.

15. The computer program product of claim 13 wherein selecting a particular path for delivery of the data copy offload command from the host device to the storage system based at least in part on the ordered arrangement of available initiator-target pairs characterized by the data structure comprises:
   obtaining a unique identifier from the data copy offload command;
   performing a modulo arithmetic operation using the unique identifier; and
   selecting the particular path from the ordered arrangement based at least in part on a result of the modulo arithmetic operation.

16. A method comprising:
   maintaining, by a multi-path input-output driver in a host device, a data structure characterizing an ordered arrangement of available initiator-target pairs corresponding to respective paths between the host device and a storage system, the data structure comprising a plurality of entries for respective ones of the initiator-target pairs, a given one of the entries of the data structure for a corresponding one of the initiator-target pairs comprising a first field that includes an identifier of that initiator-target pair in a first ordered sequence of initiator-target pair identifiers and a second field that includes a particular one in a second ordered sequence of a plurality of numbers assigned by the host device to respective ones of the initiator-target pairs, the assigned numbers being different than and separate from the corresponding initiator-target pair identifiers, the second ordered sequence comprising an integer sequence in which each integer in the integer sequence is different than every other integer in the integer sequence and in which a total number of integers in the integer sequence is equal to a total number of the initiator-target pairs, the initiator-target pair identifiers and the assigned numbers of the respective first and second fields of the plurality of entries being ordered within the data structure in accordance with the respective first and second ordered sequences;
   obtaining, in the multi-path input-output driver, a data copy offload command to offload a data copy operation from the host device to the storage system;
   selecting, in the multi-path input-output driver, a particular path for delivery of the data copy offload command from the host device to the storage system based at least in part on the ordered arrangement of available initiator-target pairs characterized by the data structure, the particular path being selected as a function of (i) one or more of the assigned numbers in respective corresponding instances of the second field of the data structure and (ii) a list identifier of the data copy offload command, the list identifier being assigned to the data copy offload command in conjunction with generation of the data copy offload command, wherein the function is configured to uniquely map each of the list identifier of the data copy offload command and an additional list identifier of an additional command related to the data copy offload command to the particular path via a same particular one of the one or more of the assigned numbers in the respective corresponding instances of the second field of the data structure;
   sending, by the multi-path input-output driver, the data copy offload command from the host device to the storage system using the selected path, without storing an indication of the selected path used to send the data copy offload command;
   to detect, in the multi-path input-output driver, a condition under which (i) at least one initiator-target pair has been added to or removed from the available initiator-target pairs and (ii) a number of in-flight data copy offload commands is zero; and
   responsive to the detected condition, to modify the data structure to update the first and second ordered sequences;
   wherein the method is performed by at least one processing device comprising a processor coupled to a memory.

17. The method of claim 16 wherein maintaining the data structure characterizing the ordered arrangement of available initiator-target pairs corresponding to respective paths between the host device and the storage system comprises:
   determining respective identifiers of the available initiator-target pairs;
   sorting the determined identifiers using one or more specified criteria;
   assigning numerical values in a numerical sequence to the sorted identifiers; and
   storing the assigned numerical values in association with the respective corresponding identifiers in the data structure.

18. The method of claim 16 wherein selecting a particular path for delivery of the data copy offload command from the host device to the storage system based at least in part on the ordered arrangement of available initiator-target pairs characterized by the data structure comprises:
   obtaining a unique identifier from the data copy offload command;
   performing a modulo arithmetic operation using the unique identifier; and
   selecting the particular path from the ordered arrangement based at least in part on a result of the modulo arithmetic operation.

* * * * *